May 11, 1965     H. B. DRAPEAU     3,182,911
DUAL THERMOSTATIC VALVE
Filed Oct. 17, 1963     2 Sheets-Sheet 1
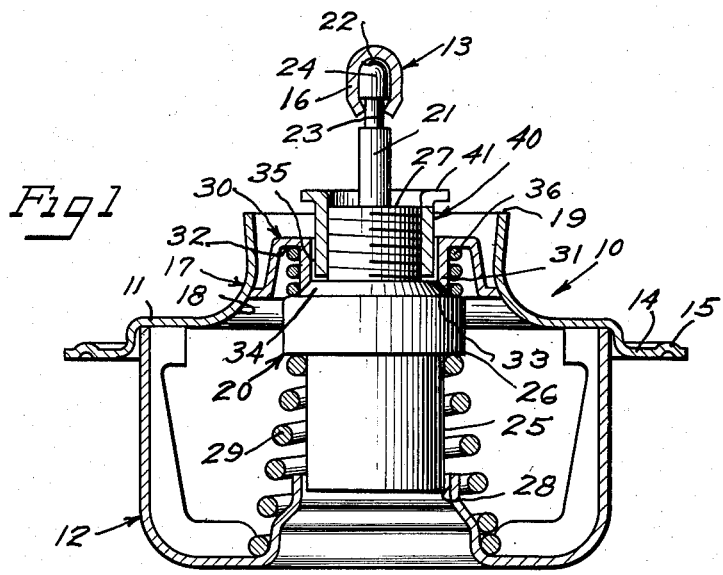
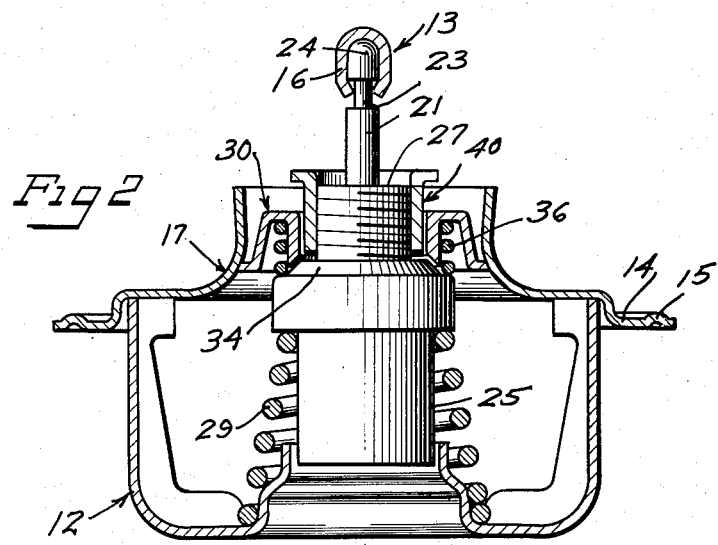
INVENTOR.
Harold B. Drapeau
BY
ATTORNEYS

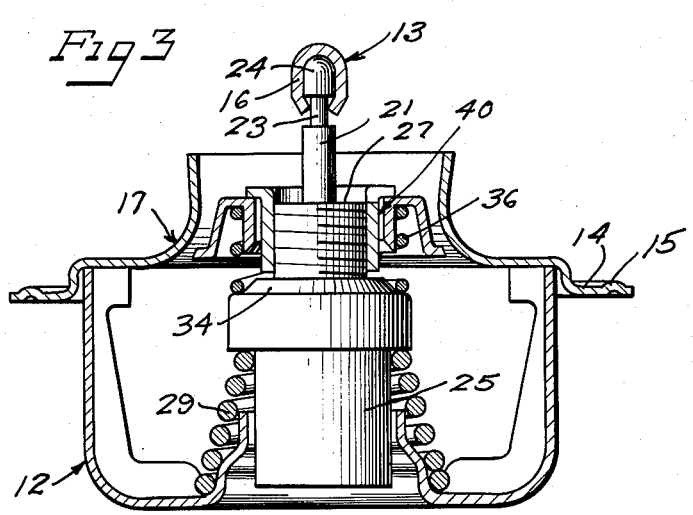

United States Patent Office 3,182,911
Patented May 11, 1965

3,182,911
DUAL THERMOSTATIC VALVE
Harold Burton Drapeau, Oak Park, Ill., assignor to The Dole Valve Company, Morton Grove, Ill., a corporation of Illinois
Filed Oct. 17, 1963, Ser. No. 316,965
2 Claims. (Cl. 236—34)

The present invention relates to waterline thermostats and more paritcularly relates to a poppet type double action thermostat in which a small flow area fluid passage is opened prior to opening of the main flow port.

Thermostats of this general type are advantageous from a size and cost standpoint because they require a smaller power source to effect actuation of the valves. In addition, finer thermostatic control of the flow of water through the cooling system of an engine can be attained than with the conventional single action thermostatic valve.

The double action thermostat of the present invention is designed to be used in conjunction with a solid filled temperature sensitive power unit of the type having a casing with a power member guided therein and extensible therefrom upon predetermined variances in temperatures ambient the temperature sensitive portion of the casing thereof. The outer end of the power member is secured within a stirrup extending over and spaced from a central port and the body or casing of the element itself extends through the port and is guided in a bracket on the opposite side of the port. An annular valve member having a peripheral seating surface engageable with the throat of the thermostat defining the flow port is loosely carried on the casing of the power unit. A flanged collar is mounted on the casing and coacts with the valve member upon extensible movement of the casing from the power member to unseat the valve member from the throat and permit fluid flow through the large thermostat throat.

In addition, an inner annular seating surface is formed on the valve member and this seating surface coacts with a valve seat formed on the casing of the power unit itself to control the flow of fluid through a relatively small flow area annular passage formed between the power unit and the adjacent surface of the valve member. The flanged collar is adjustably mounted on the power unit casing to provide a means for adjusting the point at which the power unit will pick up the valve member and unseat it from the thermostat throat in its movement away from the stirrup.

It is therefore an object of the present invention to provide a new and improved dual action waterline thermostat of the same broad general type as that characterized herein and it is a more specific object of this invention to provide a waterline thermostat having adjustable means for determining the point at which the power unit will pick up and unseat the main valve member from its associated seat.

These and other objects of my invention will become apparent from time to time as the following specification proceeds and with reference to the accompanying drawings, wherein:

FIGURE 1 is a vertical sectional view through a thermostat constructed in accordance with the principles of my invention which shows the power unit in side elevation and which shows the thermostat in an initial or "cold" condition;

FIGURE 2 is identical in nature to FIGURE 1 but for the fact that it shows the power unit in an intermediate heated position permitting a small flow of water in the annular passage between the collar and the inner surface of the valve member; and FIGURE 3 is a view similar in nature to FIGURES 1 and 2 but showing the thermostat with the power unit in a "heated" position wherein the main valve is unseated from the thermostat throat.

The thermostat 10 comprises a three-part assembly including a transverse wall piece 11, a depending bracket 12, and an upstanding stirrup 13. The bracket 12 has inwardly extending ribs 16 formed integrally therewith as does the stirrup 13. The bracket and stirrup are each rigidly secured to the transverse wall piece 11 in a conventional manner extending protruding ribs formed on the ends of the legs of the respective members through complementary slots in the wall piece and peening these ribs over the wall piece.

An outwardly extending flange 14 is provided for the purpose of clamping the thermostat 10 in place within a cooling system flow passage and a lip 15 is raised from the flange 14 for coaction with a resilient gasket to insure a fluid-tight seal between the thermostat and its mounting elements. The thermostat is designed to be mounted within a coolant flow passage so that the bracket 12 is on the upstream or engine side of the thermostat and the stirrup 13 is on the downstream or radiator side thereof.

A throat 17 is formed centrally within the wall piece 11 and this throat diverges from its curvilinear narrow neck 18 in a downstream direction to an annular lip 19. The throat of course defines the main flow port of the thermostat through which water flows as it passes from the engine to the radiator.

A temperature sensitive or thermostatically actuable power unit 20 extends through the flow port defined by the throat 17 and has its power member 21 seated within a socket 22 formed in the stirrup 13. The power member 21 has a circumferential recess 23 formed at the outer end thereof to define a head 24. It is this head 24 which is seated within the socket 22. Portions of the ribs 16 are crimped inwardly about the head 24 and extend into the recess 23 to insure that the head will not move out of the socket 22. This mode of power member mounting permits some rockable movement of the unit 20 and insures long thermostat life by preventing stirrup breakage so often occasioned when power units are rigidly affixed to their respective stirrups.

The power unit 20 is of the solid-fill type and has a casing including a temperature sensing portion 25, a diametrically enlarged collar 26, and a cylindrically shaped guide 27 from which the power member 21 extends. The sensing portion 25 contains a crystalline wax of a type which fuses and expands when its temperature is raised above a predetermined critical point. Such expansion is transmitted to the power member 21 to cause relative extensible movement between it and the power unit casing as is well known in the art. Those skilled in this art are also aware of the fact that waxes of various types can be employed in the unit so that relative extensible movement of the power member will be effected at a plurality of temperature levels.

The base of the bracket 12 is turned upwardly to form a circular wall 28 through which the sensing portion 25 of the unit 20 extends. The wall 28 thus loosely guides the casing throughout its extent of travel in operation. A stiff conical compression spring 29 encircles the upturned wall 28 and, at its small diameter end, engages the underside of collar 26. This spring serves to return the casing to the position shown in FIGURE 1 when the temperature ambient the sensing portion 25 of unit 20 falls below the critical point of any substance contained therein.

An annular valve member 30 is loosely carried on the power unit 20 and has a peripheral seating surface 31 which is engageable at all points with the seat formed by curvilinear neck 18. The seating surface 31 is bevelled so as to roughly conform to the seating surface on neck 18 to provide for better mating between the valve member and neck 18.

A cylindrically configured depending flange 31 encircles the guide 27 and defines a spring well 32. The chamfered annular lip 33 of the flange 31 itself acts as a valving element and coacts with a beveled seat 34 formed on the collar 26 around the guide 27 to control the flow of water through a passage 35 formed along the inner wall of the depending flange 31.

A light compression spring 36 fits within spring well 32 and is interposed between the valve member 30 and the flat upper annular surface of the collar 26 to resiliently bias the valve member 30 into engagement with the seating surface of the neck 18.

When the temperature ambient the temperature sensing portion 25 of power unit 20 falls below the critical temperature of the substance contained therein, heavy duty spring 29 will urge the power unit casing toward the stirrup 13, thus forcing the valve member into engagement with the neck 18 and the beveled seat 34 into engagement with the chamfered valve lip 33 to completely block all water flow through the thermostat.

As the temperature ambient the sensing portion 25 rises to the critical temperature range of the unit the casing will begin to back-off from the power member 21. The various parts of the thermostat are shown in an intermediate heated position in FIGURE 2. In this position the seat 34 has backed away from valving element 33 and water is free to pass therebetween and through the small flow area passage 35. It will be observed that light spring 36 still biases the valve member into seated relation with the neck 18 even though the casing has backed-off some distance from the power member 21.

At this juncture it will be noted that a collar 40 is adjustably mounted in threaded relation on the guide 27 and that the collar has an outturned flange 41 which is engageable with the valve member 30. The distance between the flange 41 and beveled seat 34 is greater than the distance between the flat surface 42 of the valve member and the valving portion 33 thereof so that the casing of power unit 20 can move without moving valve member 30.

Continued movement of the casing however will move the flange 13 into engagement with the flat surface 42 of the valve member 30 and lift it from its seated position as is shown in FIGURE 3. Because of the threaded mounting of collar 40, its axial position on the guide can be varied to predetermine the point in its operating cycle when the power unit will pick up and carry the valve member. Although not so illustrated, the collar could be designed so that it could, in one axially mounted position, maintain the valve member in its seated position on the power unit so that, if desired, the thermostat could quickly be converted from a double to a single acting one. In a like manner, if desired, the axial position of the collar could be varied so that the collar 40 would never act to pick up and unseat the valve member 30 in the operating range of the power unit.

It will be observed that the flange 41 is slotted as at 41a at several points about its circumference so that water can pass therethrough from the passage 35 even when the flange 41 is seated on the valve member 30.

It will be understood that other modifications and variations in the present invention could be made without departing from the spirit and scope of the novel concepts thereof.

I claim as my invention:

1. A waterline thermostat comprising:
   a transverse wall piece having a throat formed therein defining a flow port and having a bracket connected thereto and extending across said flow port on one side of said wall piece,
   a stirrup connected to said wall piece and extending across and spaced from said flow port on the other side of said wall piece from said bracket,
   a temperature responsive power unit having a casing and having a power member guided within said casing and extensible therefrom upon increases in the ambient temperature above a predetermined critical point,
   means mounting said power member on said stirrup and guiding said sensing portion within said bracket,
   means biasing said sensing portion toward said stirrup,
   a collar mounted on said casing and having an outturned flange,
   a valve seat formed on said casing in spaced relation from said flange and facing in the direction of said flange,
   an annular valve member guided for movement on said casing between said valve seat and said flange and having a seating surface formed on its outer periphery and engageable with said throat to control fluid flow therethrough,
   a second seating surface formed on the inner periphery of said valve member and engageable with said valve seat,
   wherein an annular flow passage is formed between said power unit and said valve member,
   means biasing said valve member in the direction of said stirrup, and
   means on said casing for varying the spaced relation between said flange and said valve seat.

2. A waterline thermostat constructed in accordance with claim 1 wherein said collar is adjustably mounted on said casing to provide a means whereby the spaced relation between said flange and said valve seat can be varied.

References Cited by the Examiner

UNITED STATES PATENTS

| | | | |
|---|---|---|---|
| 2,857,105 | 10/58 | Drapeau | 236—34 |
| 2,873,070 | 2/59 | Drapeau | 236—34 |
| 2,885,152 | 5/59 | Bondurant | 236—34 |
| 2,926,853 | 3/60 | Wood | 236—34 |

EDWARD J. MICHAEL, *Primary Examiner.*